United States Patent [19]
Kaijala

[11] Patent Number: 6,040,756
[45] Date of Patent: Mar. 21, 2000

[54] COMPACT POTENTIOMETER

[75] Inventor: Murray Kaijala, Elkhart, Ind.

[73] Assignee: CTS Corproation

[21] Appl. No.: 09/250,621

[22] Filed: Feb. 16, 1999

[51] Int. Cl.[7] .................................................. H01C 10/30
[52] U.S. Cl. ......................... 338/160; 338/162; 338/167; 338/171; 338/184
[58] Field of Search .................................. 338/160–164, 338/167, 170, 171, 183, 184

[56] References Cited

U.S. PATENT DOCUMENTS

| | | |
|---|---|---|
| 4,334,352 | 6/1982 | VanBenthuysen . |
| 4,430,634 | 2/1984 | Hufford et al. . |
| 4,435,691 | 3/1984 | Ginn . |
| 4,621,250 | 11/1986 | Echasseriau et al. . |
| 4,643,497 | 2/1987 | Oelsch . |
| 4,864,273 | 9/1989 | Tsuzuki et al. . |
| 5,133,321 | 7/1992 | Hering et al. ............................ 123/399 |
| 5,144,277 | 9/1992 | Ishihara et al. ......................... 338/164 |
| 5,385,068 | 1/1995 | White et al. . |
| 5,415,144 | 5/1995 | Hardin et al. . |
| 5,828,290 | 10/1998 | Buss et al. . |
| B1 4,355,293 | 9/1985 | Driscoll . |

*Primary Examiner*—Lincoln Donovan
*Assistant Examiner*—Richard K. Lee
*Attorney, Agent, or Firm*—Mark P. Bourgeois

[57] ABSTRACT

A sensor is disclosed that fits in a compact package. This compact sensor is ideal for sensing rotary positions and for accommodating one or more potentiometers. The resistor track is parallel and opposed to the collector track, and the wiper is placed between the two tracks to swipe both of them in one embodiment. This allows a short package, because the tracks are opposed to each other rather than being in a line, and a narrow package, because the tracks are not placed side by side. Another advantage of the invention is that putting the resistor track on a larger radius and the collector track on a smaller radius allows the resistor track to be longer. Having a longer resistor track allows a higher resolution, yet a package containing the potentiometer will still be relatively small. Several potentiometers may be placed in the sensor to provide redundancy yet retain compactness.

20 Claims, 1 Drawing Sheet

COMPACT POTENTIOMETER

BACKGROUND OF THE INVENTION

1. Technical Fields

This invention generally relates to position sensors and more specifically relates to a high resolution potentiometer placed in a small package.

2. Background Art

Position sensors are widely used in a number of industries to measure the position of various mechanical devices. In particular, position sensors are used in the automobile industry for this purpose. For instance, the position of a driver's seat may be measured and recorded to be recalled later; this allows two or more people to store individual seat positions. As another example, the position of the accelerator pedal may be taken and this position used for various purposes, such as adjusting the throttle. These types of positions can be determined by sensing the angular rotation of a rotor. The farther in angular position the rotor has rotated, the greater the seat inclination or declination, or the faster or slower the driver wishes to go.

Many of these rotary position sensors are made from potentiometers. The position of the wiper on the surface of the potentiometer's resistor and collector tracks determines a voltage. If this voltage is compared to the total voltage across the resistor, a voltage divider may be used to determine the angular position of the rotor. Various conventional devices relate to position sensors. The following examples of patents pertinent to the present invention are hereby incorporated by reference for their pertinent and supportive teachings:

U.S. Pat. No. 4,621,250 to Echasseriau et al. for a rotary sensor, particularly for measuring angular position;

U.S. Pat. No. 4,435,691 to Ginn for a dual track resistor element having nonlinear output;

U.S. Pat. No. 4,430,634 to Hufford et al. for a rotary potentiometer with a molded terminal package;

U.S. Pat. No. 4,643,497 to Oelsch for a device and method for connecting a printed circuit film; and U.S. Pat. No. 5,828,290 to Buss et al. for a modular position sensor; each of which is herein incorporated by reference for its pertinent and supportive teachings.

Potentiometer sensors such as those described above suffer from several drawbacks. Currently, the resistor and collector tracks are either placed next and parallel to each other, which makes for a deep potentiometer, or are placed along the same line, which makes for a long potentiometer. The tight engine, passenger, and dashboard compartments of today's cars necessitate small sensors, and the current potentiometer sensors are larger than what is convenient.

The relatively large size of potentiometer sensors can be exacerbated by high resolution requirements. Many position sensors in automobiles are required to sense position with a high degree of accuracy. For instance, potentiometers used to determine throttle or accelerator position need to be very accurate. To get this accuracy in potentiometers, the resistor track is generally lengthened. lengthening the resistor track correspondingly makes a relatively large potentiometer even larger.

In addition, some sensors need dual potentiometers for redundancy. In particular, pedal position or throttle sensors in automobiles need redundancy: if only one potentiometer is used and this sensor fails, a potentially dangerous situation may result. By using two potentiometers in these sensors, a failure of one sensor should avoid a potentially catastrophic situation because the second sensor may not fail and may thus still be used to sense throttle position. Using dual potentiometers in one sensor creates an even larger sensor that must fit in cramped automobile spaces.

Thus, without a way to make potentiometers smaller while retaining high resolution and possibly redundancy, potentiometer sensors will be larger than ideal and will be hard to fit into cramped spaces.

The foregoing patents reflect the most relevant state of the art of which the applicants are aware and are tendered with the view toward discharging applicant's acknowledged duty of candor in disclosing information that may be pertinent in the examination of this application. It is respectfully stipulated, however, that none of these patents teach or render obvious, singly or when considered in combination, applicant's claimed invention.

SUMMARY OF PREFERRED EMBODIMENT

According to the present invention, a sensor is disclosed that fits in a compact package. This compact sensor is ideal for sensing rotary positions and for accommodating one or more potentiometers. The resistor track is parallel and opposed to the collector track, and the wiper is placed between the two tracks to swipe both of them in one embodiment. This allows a short package, because the tracks are opposed to each other rather than being in a line, and a narrow package, because the tracks are not placed side by side. Another advantage of the invention is that putting the resistor track on a larger radius and the collector track on a smaller radius allows the resistor track to be longer. Having a longer resistor track allows a higher resolution, yet a package containing the potentiometer will still be relatively small.

In a second embodiment, two or more potentiometers are mounted so that the resistor tracks are next to and parallel to each other. The collector tracks are also next to and parallel to each other, but are positioned opposite the matching resistor tracks. This allows for a compact design in sensors requiring more than one position sensor.

There has thus been outlined, rather broadly, the more important features of the invention so that the detailed description thereof that follows may be better understood. There are, of course, additional features of the invention that will be described hereinafter which will form the subject matter of the appended claims. Those skilled in the art will appreciate that the preferred embodiment may readily be used as a basis for designing other structures, methods and systems for carrying out the several purposes of the present invention. It is important, therefore, that the claims are regarded as including such equivalent constructions since they do not depart from the spirit and scope of the present invention.

BRIEF DESCRIPTION OF DRAWINGS

The preferred embodiments of the present invention will hereinafter be described in conjunction with the appended drawings, where like designations denote like elements, and.

Figure 1:
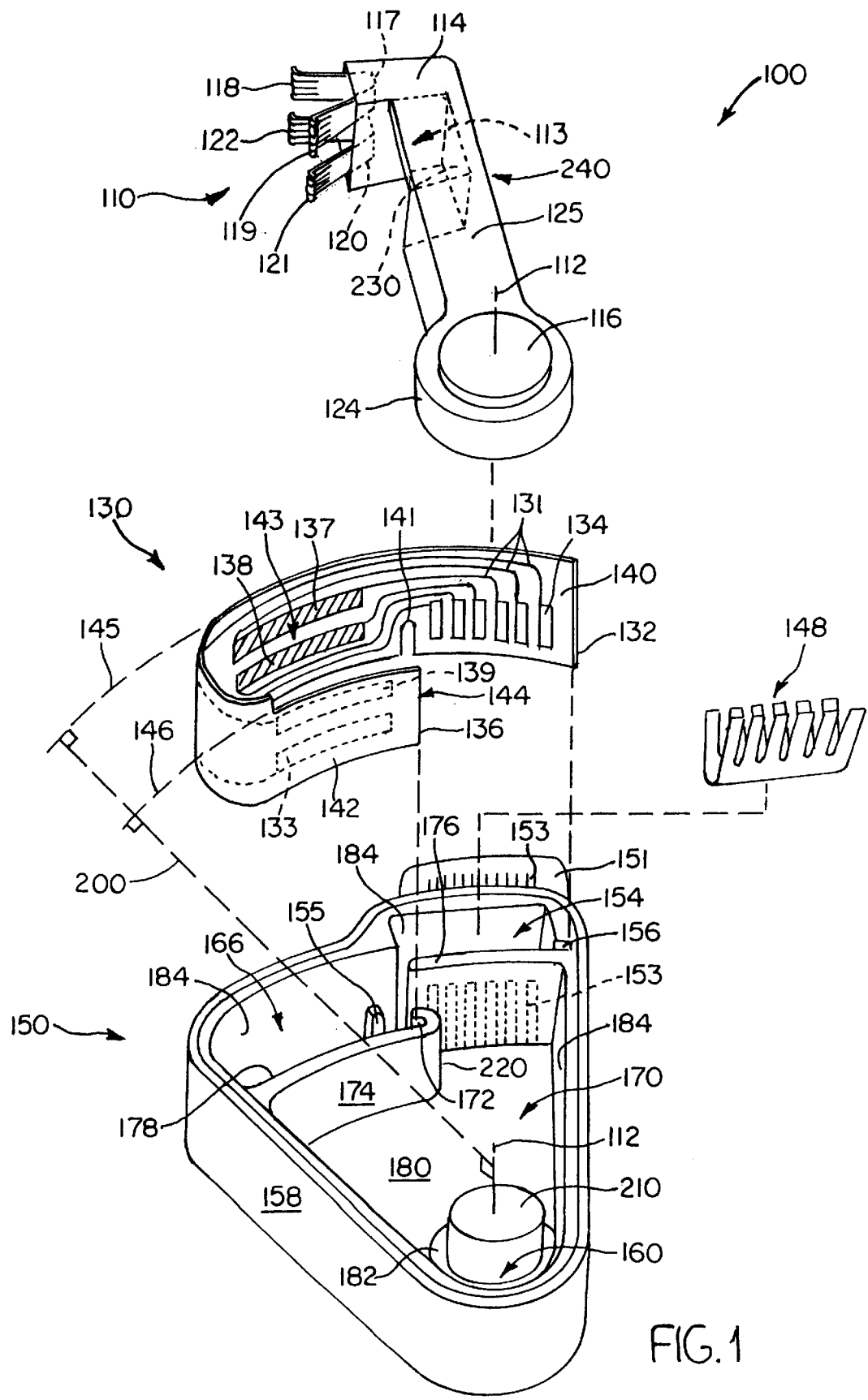
FIG. 1 is an exploded view of a preferred embodiment of a rotary position sensor in accordance with a preferred embodiment of the present invention.

It is noted that the drawing of the invention is not to scale. The drawing is merely a schematic representation, not intended to portray specific parameters of the invention. The drawing is intended to depict only typical embodiments of the invention, and therefore should not be considered as limiting the scope of the invention. The invention will be described with additional specificity and detail through the accompanying drawings.

DESCRIPTION OF THE PREFERRED EMBODIMENT

Referring now to FIG. 1, a rotary position sensor 100 is shown. Rotary position sensor 100 is used to sense the rotary position of a shaft 210. In this example, rotary position sensor 100 may be used to sense the position of the throttle (or pedal) of a car. The sensor should also be accurate, having a high resolution, and have a redundant feature. Not shown in FIG. 1 are a cover, any seals used to keep the sensor free of contaminants, and any spring or other system, if used, to return shaft 210 to its starting location. Rotary position sensor 100 comprises a wiper arm 110, a film 130, a package or housing 150, and a wedge 148.

The Potentiometers

Film 130 is preferably a flexible film suitable for containing electronic circuits and runs. Film 130 has a first surface 140 and a second parallel and opposite side surface 142. In this embodiment, traces and electronic components are located on first surface 140; however, components and traces may be placed on either side. First surface 140 may contain multiple contact pads 134, multiple traces 131, two resistive tracks 137, 138, and two collector tracks 133, 139. The resistive tracks 137, 138 are formed on a first portion 143 of first surface 140, and the collector tracks 133, 139 are formed on a second portion 144 of first surface 140. Although an exemplary two resistor and collector tracks are shown, more or less resistor and collector tracks may be used depending on application. Film 130 is shaped such that the first portion 143 is substantially parallel and opposed to the second portion 144. First portion 143 is formed along a first radius 145, while second portion 144 is formed along second radius 146. First radius 145 and second radius 144 are preferably perpendicular to ray 200 that intersects and is perpendicular to pivot axis 112. If high resolution is desired, it is preferred that resistive elements 137, 138 be formed in film 130 at first radius 145 and not at second radius 146 so that the resistive elements will be at a longer radius. This ensures that resistive elements 137, 138 are longer (as compared to being placed on a shorter radius) for the same angular displacement, which allows for greater position sensing resolution. Film 130 also comprises locating notch 141, first edge 132, and second edge 136, which are used to better secure film 130 in housing 158. Housing 158 will be discussed below.

Turning now to wiper arm 110, there is a cylindrical region 124, a body 125, and a head 114. Cylindrical region 124 contains a rotor 116 that couples to the rotatable shaft 210. Wiper arm 110 rotates about pivot axis 112. Body 125 contains a clearance pocket 113, which is sized for the necessary angular travel of the wiper arm. Clearance pocket 113 comprises an inner wall 230. Body 125 comprises an outside wall 240 that is opposite inner wall 230 for part of the length of outside wall 240. Head 114 contains two wipers 117, 120, each having two contacts 118, 119 and 122, 121, respectively. Although two wipers are shown, the number of wipers depends on the number of resistor/collector tracks, and this number may vary depending on application.

In operation, wipers 117 and 120 are situated between resistive tracks 137, 138 and collector tracks 139, 133 and are wipably engaged to these tracks. Wiper 117, resistive track 137 and collector track 139 define an upper potentiometer. First contact 118 is located at a first radius 145, while second contact 119 is located at a second radius 146. As wiper arm 100 moves radially, wiper 117 slidably or wipably engages resistive track 137 and collector track 139 to allow variable voltages to be transmitted through respective traces 131 to contact pads 134 and then to external signal conditioning circuitry. As is well known in the art, a voltage divider will then determine the angular position of wiper arm 110 and shaft 210 connected thereto. The external signal conditioning circuitry may be added internally to the sensor, if desired. Similarly, Wiper 120, resistive track 138 and collector track 133 define a lower potentiometer. First contact 122 of wiper 120 is located at first radius 145, while second contact 121 of wiper 120 is located at second radius 146. As wiper arm 100 moves radially, wiper 120 slidably or wipably engages resistive track 138 and collector track 133 to allow variable voltages to be transmitted through respective traces 131 to contact pads 134 and then to external signal conditioning circuitry.

In the example of FIG. 1, two potentiometers are used to provide redundancy. Redundancy is important in applications such as throttle or pedal position indication, because a failure of a potentiometer in these situations could cause a stuck throttle, which is a very dangerous predicament. If redundancy is not desired, only one of the potentiometers (a resistive track, a collector track, and a wiper) may be used.

Film 130 illustrates that two potentiometers may be placed in a compact space. This compactness is achieved by placing the resistive and collective tracks substantially parallel and opposed to each other, with the wiper placed therebetween. Such a compactness could not be achieved if the resistor and collector tracks were parallel, placed side by side and on the same section of film 130, because this arrangement would create a taller or wider film. Furthermore, if the resistor and collector were placed along the same circumferential line, but not opposed to each other, the film would be much longer. Placing the resistive and collective tracks parallel and opposed to each other provides a compactness not possible with other configurations. Because wipers are generally somewhat expansible and are able to make up slight imperfections in radial alignment between the first and second portions of first surface 140, these portions do not need to be exactly parallel.

The Housing

Turning now to package 150 of FIG. 1, Package 150 comprises a plastic housing 158 into which chambers 166, 154 and cavity 170 are formed. Bottom surface 180 of housing 158 has a hole 160, which is adapted to accept rotatable shaft 210. Shaft 210 would rotate about pivot axis 112 and preferably connect to rotor 116 to also rotate wiper arm 110 about pivot axis 112. Note that pivot axis 112 may also be considered a pivot point, depending on how one views the pivot axis 112. Thus, the shaft 210 and rotor 116 rotate about a pivot point.

To connect the potentiometers to the electronics outside the package, connector housing 151 is formed integral with housing 158. Connector housing 151 has internal electrical metal contacts 153 that connect internal sensors to external electronics. Electrical metal contacts 153 pass through housing 158 and up one side of retaining wall 176. Contacts 153 in retaining wall 176 have an exposed surface in chamber 154. Chamber 154 has a notch 156 into which fits first edge 132 of film 130. Retaining wall 174, formed in housing 158, and the inner wall 184 of housing 158 define chamber 166.

Retaining wall 174 has a curved surface 220 that defines notch 172. Second edge 136 of film 130 fits into notch 172. During manufacturing, film 130 is placed into housing 158 so that the edges fit into the notches, as previously discussed, and so that the locating notch 141 fits over locating rib 155. Wedge 148 is placed into chamber 154, and wedge 148 firmly presses against the inner wall 184 and the second surface of film 130 to press contact pads 134 onto exposed surfaces of contacts 153. Wedge 148 may be replaced by any biasing means known to those skilled in the art that is able to press pads 134 against contacts 153 with sufficient force to make an electrical contact. Such biasing means may include springs, solids, compressible materials that can expand after compression, etc.

Chamber 166 is adapted to accept film 130 and wipers 117, 120. Clearance pocket 113 is constructed to enable wipers 117, 120 to engage resistive tracks 137, 138 and collector tracks 139, 133 along the length of these tracks. During manufacturing, arm 110 is placed into cavity 170 so that wipers 117, 120 are internal to chamber 166 and wipably engage resistive tracks 137, 138 and collector tracks 139, 133. At one end of its travel, inner surface 230 of arm 110 may contact curved surface 220 of retaining wall 174. Thus, clearance pocket 113 is sized for the angular travel of rotor 116 (and correspondingly arm 110). At the other end of its travel, outside surface 240 of arm 110 may contact the inner wall 184 of housing 158. Circular ledge 182 and cylindrical region 124 cooperate to raise arm 110 to the correct height over retaining wall 174 to prevent arm 110 from contacting retaining wall 174.

Thus, package 150, when wiper arm 110 and film 130 are placed in housing 158, will be compact and thin even though in this example two potentiometers are placed into one sensor.

Variations

The compact potentiometer disclosed above has more applications than just sensing rotary movement. As long as the resistive and collector tracks are placed substantially parallel and are opposed to each other, the potentiometer formed thereby (after a movable contactor or wiper is wipably placed in contact with both tracks) will be compact relative to potentiometers where the tracks are parallel but not opposed or where the tracks are placed along an arcuate, curved, or straight line. Thus, linear motion may also be sensed by this compact potentiometer design. For instance, if movable contactors are attached, through a mechanical linkage, to part of a valve that indicates the linear position of a valve, the extent to which valve is open may be sensed by these compact potentiometers. One of the benefits of the current invention is the compactness of the potentiometer, and this compactness has wide application.

Secondly, film 130 may be replaced or supplanted by other methods of creating parallel and opposed resistor and collector tracks. For instance, in FIG. 1 a resistor track could be formed directly in inner wall 184 that defines chamber 166; a collector track could be formed directly in first surface 178 of retaining wall 174, which also defines chamber 166. Additionally, the contactor configuration need not be the wipers shown in FIG. 1; any contactor that will provide contact between collector and resistor tracks and that wipably engages these tracks may be used. Necessary traces from the two tracks to contacts 153 could be made in another manner, such as having through holes in bottom 180 to the other side of housing 158, then connecting these through holes to traces on film that contacts this other side of housing 158. These traces then could traverse the case or housing to contacts 153.

While the invention has been particularly shown and described with reference to preferred embodiments thereof, it will be understood by those skilled in the art that various changes in form and details may be made therein without departing from the spirit and scope of the invention.

What is claimed is:

1. A sensor comprising:
   a) an electrically resistive track,
   b) a collector track that is parallel and opposed to the electrically resistive track; and
   c) a wiper having a first and second contact, the first and second contacts adjacently disposed and extending in opposite directions from each other, the wiper interposed between the resistive and collector tracks, the first contact wipably engaging the resistive track and the second contact wipably engaging the collector track.

2. The sensor of 1 wherein the wiper is coupled to an external movable object.

3. The sensor of claim 2 wherein the resistive and collector tracks are located on separate arcuate lines that are perpendicular to a ray originating from a rotational axis of the object.

4. The sensor of claim 2 wherein the wiper is coupled to the external movable object through a rotor.

5. The sensor of claim 4 wherein the rotor moves linearly in relation to the external movable object, such that the sensor can sense the linear motion of the movable object.

6. The sensor of claim 3 wherein the external movable object is a shaft that is rotatable about an axis, the wiper is coupled to an arm that is coupled to the shaft, the arm rotating about the axis.

7. A rotary sensor comprising:
   a) a wiper connected to an arm having a pivot point, the wiper rotating about the pivot point and having a first contact and a second contact, the first contact being at a first radius from the pivot point, the second contact being at a second radius from the pivot point;
   b) a curved electrically resistive track defining a first cylindrical surface at the first radius, the first cylindrical surface being perpendicular to an axis that is colinear with the pivot point; and
   c) a curved collector track that is parallel and opposed to the electrically resistive track, the collector track defining a second cylindrical surface at the second radius, the second cylindrical surface being perpendicular to an axis that is colinear with the pivot point, wherein the wiper is interposed between the electrically resistive track and the collector track such that the first contact wipably engages the electrically resistive track and the second contact wipably engages the collector track.

8. The rotary sensor of claim 7 wherein the first radius is larger than the second radius.

9. The rotary sensor of claim 8 wherein the sensor further comprises a housing having an inner wall onto which the electrically resistive track is formed and having a retaining wall onto which the collector track is formed.

10. The rotary sensor of claim 9 wherein the housing further comprises
    a) electrical traces coupled to the resistive and conductive tracks; and
    b) an input and an output pad, coupled to the electrical traces.

11. The rotary sensor of claim 10 wherein the arm further comprises a clearance pocket that allows the arm to clear the retaining wall.

12. A sensor for sensing a position of an attached movable object, comprising:
   a) a housing defining two opposing sides of a cavity and a third side of the cavity that joins the two opposing sides;
   b) a potentiometer, positioned in the housing, for generating a signal that indicates the position of the attached movable object, having:
      i) a resistive track, located on one of the opposing sides;
      ii) a conductive track, located on the other opposing side; and
      iii) a movable contactor having a first and second contact, the first and second contacts adjacently disposed and extending in opposite directions from each other, the contactor located between the first and second sides of the cavity and being movably resposive to the attached movable object, wherein the first contact wipably engages the resistive track and the second contact wipably engages the conductive track; and
   c) a mechanical linkage, positioned in the housing, for mechanically linking the attached movable object to the contactor.

13. The sensor of claim 12 wherein the resistive track is longer than the conductive track.

14. The sensor of claim 13 wherein the resistive and conductive track are located on separate arcuate lines that are perpendicular to a ray originating from a rotational axis of the object.

15. The sensor of claim 12 wherein the potentiometer further comprises a flexible film having the resistive and collective tracks mounted thereon, the flexible film curved around to contact the first and second cavity sides.

16. The sensor of claim 13 wherein the mechanical linkage is a wiper arm including:
   a) a rotor, attached to one end of the wiper arm, for coupling to the movable object; and
   b) a head, coupled to an opposite end of the wiper arm, for holding the contactor in the cavity and positioning the contactor to be in contact with the resistive and conductive tracks.

17. The sensor of claim 14 wherein the movable contactor comprises a single piece of conductive material bent in a U-shape.

18. The sensor of claim 15 wherein the film further comprises:
   a) electrical traces coupled to the resistive and conductive tracks; and
   b) an input and an output pad, coupled to the electrical traces.

19. The sensor of claim 18 wherein the housing further comprises:
   a) input and output contacts coupled to the input and output pads, respectively, at one end, and coupled to conditioning circuitry at an opposite end; and
   b) a retaining wall, located in the housing, for retaining three sides of the one end of the contacts that are coupled to the input and output pads.

20. The sensor of claim 19 wherein the sensor further comprises:
   a biasing means, positioned in the housing, for biasing the input and output pads against the contacts.

* * * * *